United States Patent
Walter et al.

(10) Patent No.: US 9,360,394 B2
(45) Date of Patent: Jun. 7, 2016

(54) METHOD FOR SPECIFYING A MALFUNCTION OF AN EXHAUST GAS RECIRCULATION SYSTEM OF AN INTERNAL COMBUSTION ENGINE OF A MOTOR VEHICLE AND CORRESPONDING DIAGNOSTIC DEVICE

(71) Applicant: ROBERT BOSCH GMBH, Stuttgart (DE)

(72) Inventors: Andreas Walter, Vaihingen (DE); Heiko Lenhardt, Limburgerhof (DE); Michael Hackner, Winterbach (DE); Johannes Zeidler, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/369,755

(22) PCT Filed: Dec. 27, 2012

(86) PCT No.: PCT/EP2012/076924
§ 371 (c)(1),
(2) Date: Jun. 30, 2014

(87) PCT Pub. No.: WO2013/098305
PCT Pub. Date: Jul. 4, 2013

(65) Prior Publication Data
US 2015/0047425 A1 Feb. 19, 2015

(30) Foreign Application Priority Data
Dec. 28, 2011 (DE) .................... 10 2011 090 059

(51) Int. Cl.
*G01M 15/10* (2006.01)
*F02D 41/00* (2006.01)
*F01N 11/00* (2006.01)
*F02D 41/18* (2006.01)

(52) U.S. Cl.
CPC .............. *G01M 15/10* (2013.01); *F01N 11/00* (2013.01); *F02D 41/0055* (2013.01); *F02D 41/18* (2013.01); *F02D 2200/0411* (2013.01); *Y02T 10/47* (2013.01)

(58) Field of Classification Search
CPC .......... F02M 25/0702; F02M 25/0707; F02M 25/0709; Y02T 10/47; F02D 41/0055; F02D 2200/0411; F02D 41/18; G01M 15/10
USPC ........................................................ 73/114.74
See application file for complete search history.

(56) References Cited

U.S. PATENT DOCUMENTS

| 5,540,091 A | 7/1996 | Nakagawa |
| 6,257,214 B1 | 7/2001 | Bidner et al. |

(Continued)

FOREIGN PATENT DOCUMENTS

| CN | 1721676 A | 1/2006 |
| CN | 102062023 A | 5/2011 |

(Continued)

*Primary Examiner* — Freddie Kirkland, III
(74) *Attorney, Agent, or Firm* — Norton Rose Fulbright US LLP

(57) ABSTRACT

A method for specifying a malfunction of an exhaust gas recirculation system of an internal combustion engine of a motor vehicle, including: setting a first operating point of the engine and a first operating state of the fresh air/exhaust gas system as vehicle conditioning in a first measurement setting; measuring volumetric efficiencies of the engine for the first measurement setting and for at least one additional measurement setting, and comparing the measured volumetric efficiencies with an engine characteristics map stored in a memory unit for volumetric efficiency values of the engine, and ascertaining whether a malfunction is present during the exhaust gas recirculation process based on the comparison; and specifying the malfunction of the exhaust gas recirculation system while taking into account the measuring results for the first measurement setting and for the at least one additional measurement setting and the stored engine characteristics map for volumetric efficiency values.

9 Claims, 2 Drawing Sheets

(56) References Cited

U.S. PATENT DOCUMENTS

| | | | |
|---|---|---|---|
| 6,457,461 B1 | 10/2002 | Romzek | |
| 6,802,302 B1 | 10/2004 | Li et al. | |
| 6,848,434 B2 * | 2/2005 | Li | F02M 25/0702 |
| | | | 123/568.12 |
| 7,367,188 B2 * | 5/2008 | Barbe | F02B 37/00 |
| | | | 123/568.21 |
| 2008/0022677 A1 | 1/2008 | Barbe et al. | |

FOREIGN PATENT DOCUMENTS

| | | |
|---|---|---|
| DE | 11 2007 001467 | 4/2009 |
| DE | 11 2008 002195 | 11/2010 |
| DE | 10 2009 029316 | 3/2011 |
| GB | 2406394 A | 3/2005 |
| JP | 2008240576 A | 10/2008 |
| WO | 2009130563 A1 | 10/2009 |
| WO | 2011/024294 | 3/2011 |

* cited by examiner

METHOD FOR SPECIFYING A MALFUNCTION OF AN EXHAUST GAS RECIRCULATION SYSTEM OF AN INTERNAL COMBUSTION ENGINE OF A MOTOR VEHICLE AND CORRESPONDING DIAGNOSTIC DEVICE

FIELD OF THE INVENTION

The present invention relates to a method for specifying a malfunction of an exhaust gas recirculation system of an internal combustion engine of a motor vehicle and a corresponding diagnostic device.

BACKGROUND INFORMATION

To comply with statutory emission limiting values, modern diesel vehicles are equipped with a high-pressure exhaust gas recirculation, abbreviated HP-EGR, i.e., exhaust gas is diverted upstream from the exhaust gas turbocharger turbine and fed back to the fresh air end downstream from the exhaust gas turbocharger compressor, and a low-pressure exhaust gas recirculation, abbreviated LP-EGR, i.e., exhaust gas is diverted downstream from the particle filter and fed back into the fresh air end immediately downstream from the air flow meter. Legislation in a few markets, such as the United States, for example, requires monitoring of HP- and LP-EGR as well as, in the event of a defect, identification of the actually defective EGR path, i.e., HP- or LP-EGR. The diagnostic methods detect a defect in the exhaust gas recirculation system but cannot always assign it definitively to the high-pressure path or the low-pressure path since this would require operating points at which only the high-pressure exhaust gas recirculation path is active or only the low-pressure exhaust gas recirculation path is active.

German patent document DE 11 2008 002 195 T5 discusses a method and a device for monitoring an intake air compressor device having a variable geometry. In the method described there, an exhaust gas pressure and a guide vane position of the turbocharger device having a variable geometry are monitored. The exhaust gas pressure and the guide vane position are estimated. A residual value for the exhaust gas pressure and a residual value for the guide vane position are calculated on the basis of differences between the estimated and monitored exhaust gas pressures and guide vane positions.

On the basis of the residual value for the exhaust gas pressure and the residual value for the guide vane position, it is determined that the turbocharger is functioning properly.

German patent document DE 11 2007 001 467 T5 discusses a method for simultaneous exhaust gas recirculation and control of the combustion phase angle of a motor vehicle, combustion phase angle information being supplied by the cylinder pressure detection device, and the fuel supply device being regulated according to setpoint values and feedback in the combustion phase angle information. Furthermore, with the method described there, the exhaust gas recirculation device is regulated according to setpoint values and feedback in the case of a preselected exhaust gas recirculation control parameter. The setpoint values in the preselected exhaust gas recirculation control parameters are set on the basis of a comparison of the settings on the fuel supply device.

SUMMARY OF THE INVENTION

The present invention creates a method for specifying a malfunction of an exhaust gas recirculation system of an internal combustion engine of a motor vehicle, including the method steps: setting a first operating point of the internal combustion engine and setting a first operating state of the fresh air/exhaust gas system as vehicle conditioning in a first measurement setting; measuring volumetric efficiencies of the internal combustion engine for the first measurement setting and for at least one additional measurement setting and comparing the measured volumetric efficiencies with an engine characteristics map, stored in a memory unit, for volumetric efficiency values of the internal combustion engine, and ascertaining whether there is a malfunction in the exhaust gas recirculation system on the basis of the result of the comparison; and specifying the malfunction of the exhaust gas recirculation system, taking into account the measuring results for the first measurement setting and for the at least one additional measurement setting and the stored engine characteristics map for volumetric efficiency values.

Furthermore, the method may also be used during normal operation of a vehicle. The engine is therefore operated in an operating state which occurs during normal driving operation.

Furthermore, the present invention creates a corresponding diagnostic device having the features described herein.

The present invention advantageously makes it possible to operate the engine in operating states which do not occur during driving operation. In contrast with normal operation on the road, operation during a function test in a repair shop is not exhaust gas-relevant so that negative effects on emissions due to the operating states set during the repair shop test may be accepted. Within the framework of the repair shop test, the engine is operated in operating states in which the defect characteristic becomes evident most markedly.

According to one specific embodiment of the present invention, the additional set operating points of the internal combustion engine and/or of the additional set operating states of the fresh air/exhaust gas system of the at least one additional measurement setting are selected outside of the normal operating range of the motor vehicle.

According to one further specific embodiment of the present invention, a setpoint flow rate is assigned to the exhaust gas recirculation system and if a malfunction is ascertained, a differentiation of the malfunction takes place into a malfunction having an increased flow of the exhaust gas recirculation in comparison with the setpoint flow or into a malfunction having a reduced flow of the exhaust gas recirculation in comparison with the setpoint flow.

According to one further specific embodiment of the present invention, the volumetric efficiency of the internal combustion engine is ascertained, inter alia, on the basis of an air flow rate determined by an air flow meter.

According to one further specific embodiment of the present invention, the operating states of the exhaust gas recirculation system are set by triggering a high-pressure exhaust gas recirculation valve and a low-pressure exhaust gas recirculation valve of the exhaust gas recirculation system.

According to one further specific embodiment of the present invention, the exhaust gas recirculation system is subdivided into a high-pressure exhaust gas circulation branch and a low-pressure exhaust gas circulation branch.

According to one further specific embodiment of the present invention, in testing during a normal driving operation, the at least one additional measurement setting has detection thresholds for malfunctions of the exhaust gas recirculation system, which are reduced in comparison with the detection thresholds for malfunctions of the exhaust gas recirculation system found in the first measurement setting.

According to one further specific embodiment of the present invention, if a malfunction is ascertained during a normal driving operation, then additional operating points of the internal combustion engine and/or additional operating states of the fresh air/exhaust gas system are set as a function of the ascertained malfunction in the exhaust gas recirculation system.

Additional features and advantages of specific embodiments of the present invention are derived from the following description with reference to the accompanying drawings.

The embodiments and refinements described here may be arbitrarily combined with one another, if reasonable. Additional possible embodiments, refinements and implementations of the present invention also include combinations of features of the present invention, which were described previously or are described below with respect to the exemplary embodiments, even those not mentioned explicitly.

The accompanying drawings should provide further understanding of the specific embodiments of the present invention. They illustrate specific embodiments and help to explain principles and concepts of the present invention in conjunction with the description.

Other specific embodiments and many of the advantages cited are derived with respect to the drawings. The elements of the drawings are not necessarily shown true to scale.

DETAILED DESCRIPTION

Figure 1:
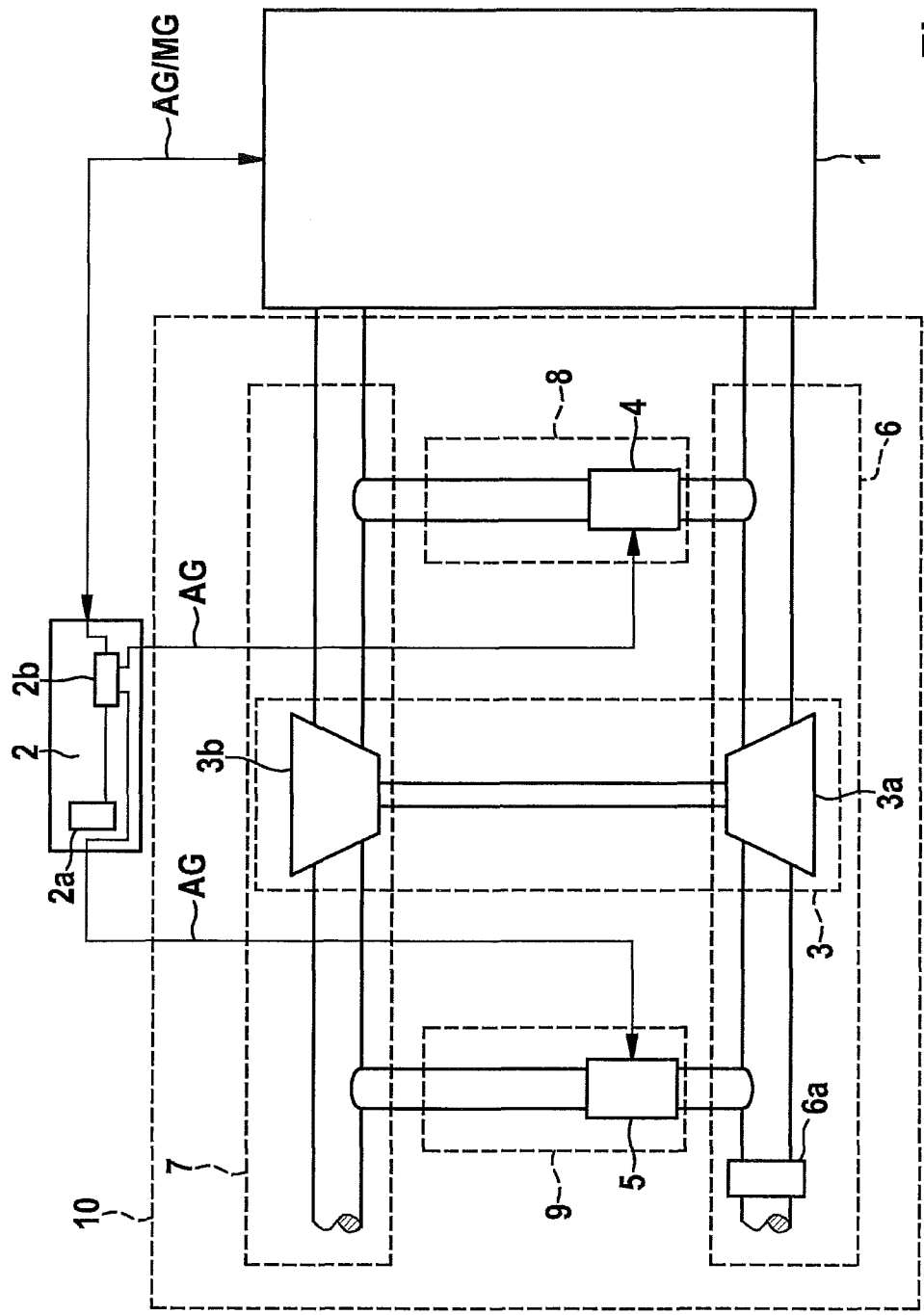
FIG. 1 shows a schematic diagram of a diagnostic device for specifying a malfunction of an exhaust gas recirculation system of an internal combustion engine according to one specific embodiment of the present invention.

The same reference numerals in the drawings are used for the same components or those having the same functions unless otherwise indicated.

FIG. 1 shows a schematic diagram of a diagnostic device for specifying a malfunction of an exhaust gas recirculation system of an internal combustion engine according to one specific embodiment of the present invention.

A diagnostic device 2 for specifying a malfunction of a fresh air/exhaust system 10 is connected to fresh air/exhaust gas system 10 of an internal combustion engine 1 of a motor vehicle.

Diagnostic device 2 includes an engine control unit 2b and a memory unit 2a. Engine control unit 2b is configured, for example, as a microprocessor-based engine control and memory unit 2a is configured as a semiconductor memory, for example, including microelectronic memory structures.

Diagnostic device 2 is configured, for example, as an onboard diagnostic system, abbreviated OBD, or as some other vehicle diagnostic system. During driving operation, all systems of the motor vehicle which influence the exhaust gas are monitored, such as, for example, fresh air/exhaust gas system 10 of internal combustion engine 1. In addition, accessible data of other important control units of the motor vehicle are queried by diagnostic device 2.

In a repair shop test from the outside, diagnostic device 2 may be read out via an access for the vehicle diagnosis via a diagnostic bushing in the vehicle. Diagnostic functions may be initiated via the same access. The results of these functions may also be read out via the diagnostic bushing.

Internal combustion engine 1 is configured, for example, as a combustion engine or as some other type of heat engine, which converts the chemical energy of a fuel into mechanical work by combustion. For example, internal combustion engine 1 is embodied as a gasoline engine or as a diesel engine.

Furthermore, fresh air/exhaust gas system 10 includes an exhaust gas turbocharger 3 including an exhaust gas turbocharger compressor 3a and including an exhaust gas turbocharger turbine 3b, a high-pressure exhaust gas recirculation valve 4 and a low-pressure exhaust gas recirculation valve 5.

Exhaust gas turbocharger 3 includes exhaust gas turbocharger compressor 3a and exhaust gas turbocharger turbine 3b, which may have very similar configurations and are mounted on a shared shaft. The exhaust gas stream induces rotation of exhaust gas turbocharger turbine 3b, which drives exhaust gas turbocharger compressor 3a via the shaft, drawing in air and compressing it. The compressed air is conducted into internal combustion engine 1.

Fresh air/exhaust gas system 10 is subdivided into an air system 6 and an exhaust gas system 7.

Diagnostic device 2 processes, for example, measured variables MG and controls fresh air/exhaust gas system 10 through triggering variables AG, which are sent to subunits of fresh air/exhaust gas system 10. For example, the operating points of internal combustion engine 1 and the operating states of fresh air/exhaust gas system 10 are set by trigger variables AG. Measured variables MG include, for example, gas flows in fresh air/exhaust gas system 10 or the volumetric efficiency of internal combustion engine 1.

Fresh air/exhaust gas system 10 also includes a high-pressure exhaust gas recirculation branch 8 and a low-pressure exhaust gas recirculation branch 9. High-pressure exhaust gas recirculation branch 8 and low-pressure exhaust gas recirculation branch 9 form two different exhaust gas recirculation paths via which exhaust gases may be conducted from the exhaust gas end, i.e., from exhaust gas system 7 to the intake end, i.e., to air system 6.

In carrying out the method for specifying a malfunction of exhaust gas recirculation system 8, 9 of internal combustion engine 1, for example, the total of the exhaust gas flows conducted through the high-pressure exhaust gas recirculation branch 8 and the low-pressure exhaust gas recirculation branch 9 is ascertained and compared by diagnostic device 2 with an engine characteristics map stored in memory unit 2a.

The engine characteristics map includes, for example, setpoint values of the volumetric efficiency of the internal combustion engine and/or setpoint values of exhaust gas flows of fresh air/exhaust gas system 10.

In the event of a defect, i.e., when there is a malfunction, there is a signal to the driver that he should visit a repair shop for further defect localization and for correction of the defect.

Alternatively, certain engine operating states are initiated via diagnostic device 2, permitting a more detailed identification of the defective exhaust gas recirculation path.

In both cases, for example, a difference is formed between the ascertained actual values for the exhaust gas flows and the setpoint values of the engine characteristics map stored in memory unit 2a, thus making it possible for diagnostic device 2 to detect a malfunction.

Deviations in the difference formed, which are greater than predetermined tolerances, then result in a further differentiation of the malfunction into a so-called low-flow malfunction or a high-flow malfunction, for example. However, the exhaust gas recirculation rate is made up of the sum of high-pressure exhaust gas recirculation branch 8 and low-pressure exhaust gas recirculation branch 9.

To achieve a more accurate identification of the defective exhaust gas recirculation path, operating points and/or operating states are then initiated, in which only either high-pressure exhaust gas recirculation branch 8 or low-pressure exhaust gas recirculation branch 9 is activated or inactivated, respectively. This activation or inactivation is achieved by regulating high-pressure exhaust gas recirculation valve 4 and low-pressure exhaust gas recirculation valve 5, i.e., the other one of the controllable exhaust gas recirculation valves of exhaust gas recirculation 10 in each case is closed completely or moved to another suitable position.

In the repair shop, all units of fresh air/exhaust gas system 10 may be triggered individually by diagnostic device 2. In this way fresh air/exhaust gas system 10 may be brought into the desired operating state, in which the type of malfunction clearly occurs, such as, for example, by an increased air mass throughput in comparison with operation on the road due to opened throttle valves and/or swirl flaps of fresh air/exhaust gas system 10, due to an increased charging pressure of internal combustion engine 1 or due to an increased engine speed of internal combustion engine 1.

For example, detection of the filling of internal combustion engine 1 may be modeled for specifying the malfunction, for example, by detecting a volumetric efficiency of internal combustion engine 1, inter alia, based on the fresh air flow rate measured by an air flow meter 6a. Air flow meter 6a is connected to diagnostic device 2, for example.

Furthermore, detection thresholds for malfunctions may be defined more precisely through defined and reproducible operating points and operating states than would be possible during normal driving operation of the motor vehicle.

By combining the information on the measurement settings with the different operating points and operating states, for example, even more extensive information about additional defects in the system may be obtained.

Figure 2:
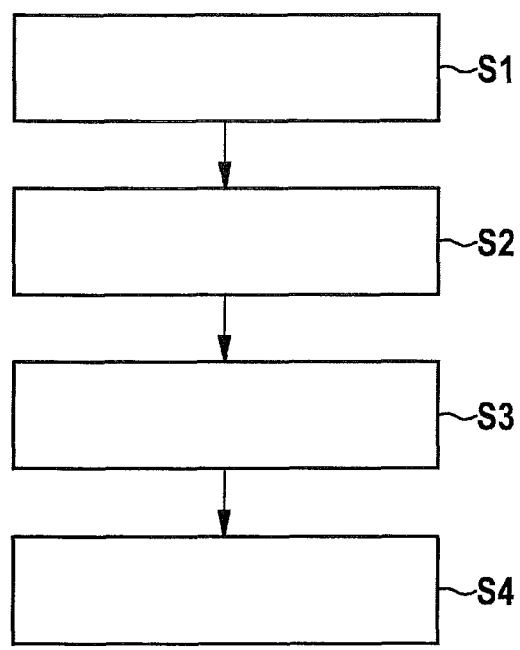
FIG. 2 shows a flow chart of a method for specifying a malfunction of an exhaust gas recirculation system of an internal combustion engine according to another specific embodiment of the present invention.

FIG. 2 shows a method for specifying a malfunction of an exhaust gas recirculation system of an internal combustion engine of a motor vehicle.

In a repair shop test, for example, this method is initiated by a repair shop testing device.

In a first step of the method, a first operating point of internal combustion engine 1 and a first operating state of fresh air/exhaust gas system 10 are set S1 as vehicle conditioning in a first measurement setting. In this first step of the method, the motor vehicle is conditioned and in particular the fresh air/exhaust gas system 10 and the internal combustion engine 1 are conditioned, thereby defining a general operating range, based on the first operating point of internal combustion engine 1 and the first operating state of fresh air/exhaust gas system 10.

In a second step of the method, a volumetric efficiency of internal combustion engine 1 is measured S2 at various operating points of internal combustion engine 1 and/or at various operating states of fresh air/exhaust gas system 10, and the measured volumetric efficiency is compared with an engine characteristics map stored in a memory unit 2a for volumetric efficiency values of internal combustion engine 1.

In a third step of the method, the features ascertained in the second step are linked together S3 by comparing the measured volumetric efficiency with an engine characteristics map stored in a memory unit 2a for volumetric efficiency values of internal combustion engine 1.

In a fourth step of the method, the diagnostic result is output S4 on a repair shop testing device or some other repair shop diagnostic device.

What is claimed is:

1. A method for specifying a malfunction of an exhaust gas recirculation system of an internal combustion engine of a motor vehicle, the method comprising:
setting a first operating point of the internal combustion engine and a first operating state of the fresh air/exhaust gas system as a vehicle conditioning in a first measurement setting;
measuring volumetric efficiencies of the internal combustion engine for the first measurement setting and for at least one additional measurement setting and comparing the measured volumetric efficiencies with an engine characteristics map stored in a memory unit for volumetric efficiency values of the internal combustion engine and ascertaining, based on the result of the comparison, whether there is a malfunction in the exhaust gas recirculation system; and
specifying the malfunction in the exhaust gas recirculation system, taking into account the measuring results for the first measurement setting and for the at least one additional measurement setting of the stored engine characteristics map for volumetric efficiency values.

2. The method of claim 1, wherein at least one of the additional set operating points of the internal combustion engine and the additional set operating states of the fresh air/exhaust gas system of the at least one additional measurement setting are selected outside of a normal operating range of the motor vehicle.

3. The method of claim 1, wherein a setpoint flow rate is assigned to the exhaust gas recirculation system and, if a malfunction is ascertained, a differentiation of the malfunction takes place into a malfunction having an increased flow rate of the exhaust gas recirculation system in comparison with the setpoint flow rate or into a malfunction having a reduced flow rate of the exhaust gas recirculation system in comparison with the setpoint flow rate.

4. The method of claim 3, wherein the volumetric efficiency of the internal combustion engine is ascertained based on an air flow determined by an air flow meter.

5. The method of claim 1, wherein the operating states of the exhaust gas recirculation system are set by triggering a high-pressure exhaust gas recirculation valve and a low-pressure exhaust gas recirculation valve of the exhaust gas recirculation system.

6. The method of claim 1, wherein the exhaust gas recirculation system is subdivided into a high-pressure exhaust gas recirculation branch and a low-pressure exhaust gas recirculation branch.

7. The method of claim 1, wherein in testing during a normal driving operation, the at least one additional measurement setting has detection thresholds for malfunctions of the exhaust gas recirculation system, these detection thresholds being reduced in comparison with the detection thresholds for malfunctions of the exhaust gas recirculation system obtained in the first measurement setting.

8. The method of claim 1, wherein, in the event a malfunction is ascertained during normal driving operation, at least one of additional operating points of the internal combustion engine and additional operating states of the fresh air/exhaust gas system are set as a function of the ascertained malfunction of the exhaust gas recirculation system.

9. A diagnostic device for testing an exhaust gas recirculation system, comprising:
a diagnostic arrangement for specifying a malfunction of the exhaust gas recirculation system of an internal combustion engine of a motor vehicle, by performing the following:

setting a first operating point of the internal combustion engine and a first operating state of the fresh air/exhaust gas system as a vehicle conditioning in a first measurement setting;

measuring volumetric efficiencies of the internal combustion engine for the first measurement setting and for at least one additional measurement setting and comparing the measured volumetric efficiencies with an engine characteristics map stored in a memory unit for volumetric efficiency values of the internal combustion engine and ascertaining, based on the result of the comparison, whether there is a malfunction in the exhaust gas recirculation system; and specifying the malfunction in the exhaust gas recirculation system, taking into account the measuring results for the first measurement setting and for the at least one additional measurement setting of the stored engine characteristics map for volumetric efficiency values.

* * * * *